June 3, 1952  E. W. MILLER  2,599,408
MACHINE FOR ROUGH MILLING AND GENERATIVE
FINISHING OF MACHINE ELEMENTS
Filed June 6, 1946  7 Sheets-Sheet 2
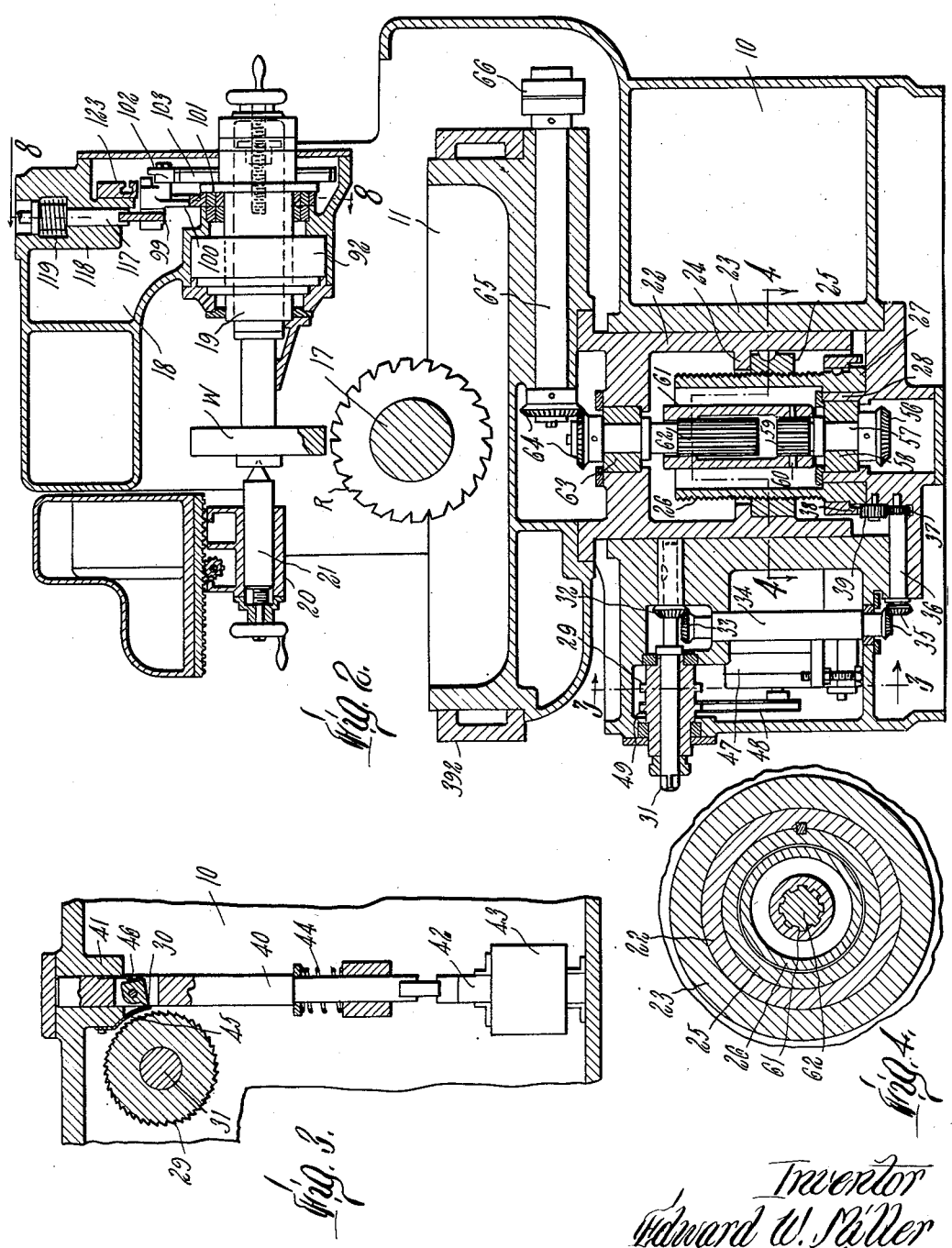
Inventor
Edward W. Miller
by Wright, Brown, Quinby & May
Attys.

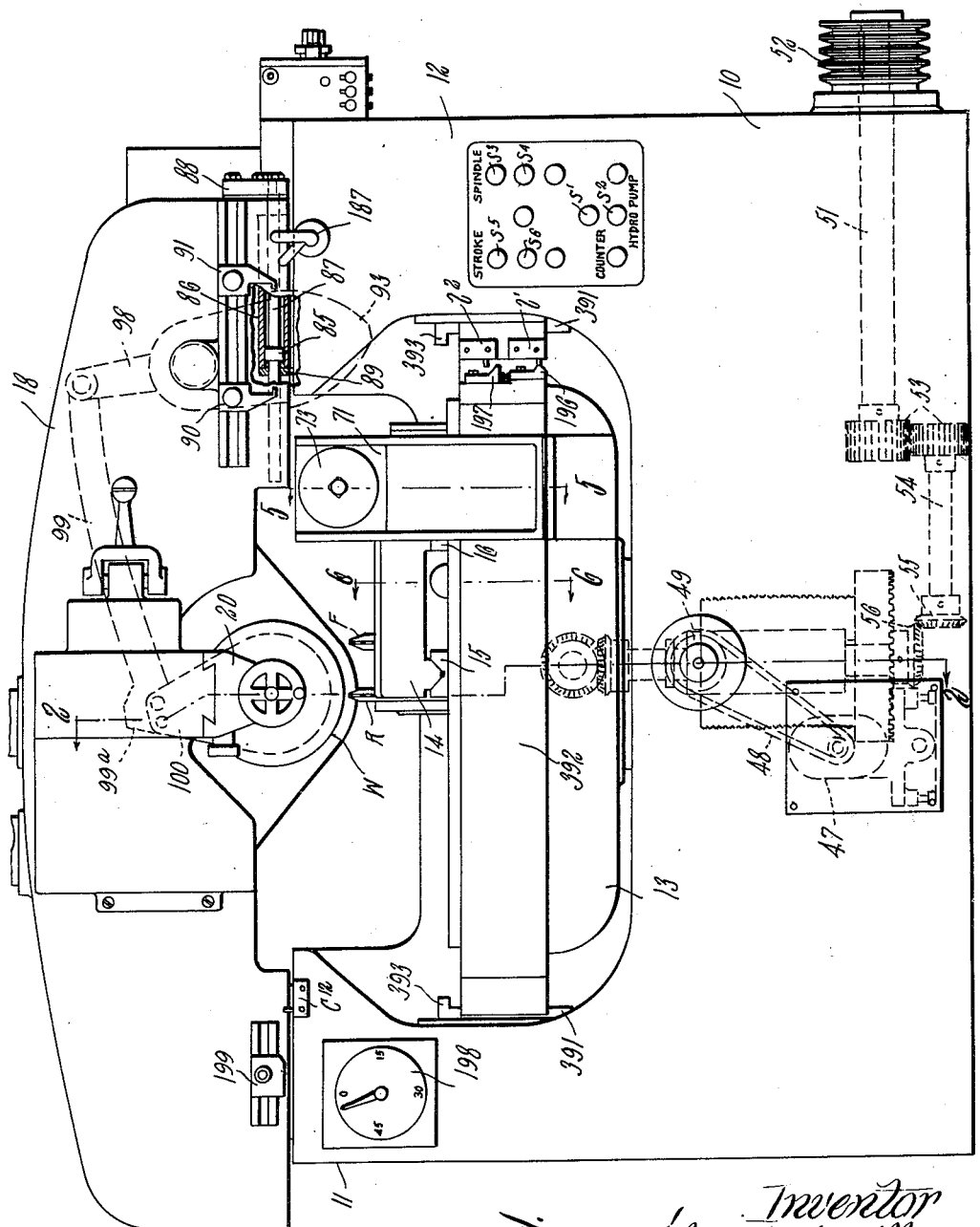

June 3, 1952 E. W. MILLER 2,599,408
MACHINE FOR ROUGH MILLING AND GENERATIVE
FINISHING OF MACHINE ELEMENTS
Filed June 6, 1946 7 Sheets-Sheet 3

Inventor
Edward W. Miller
by Wright, Brown, Quinby & May
Attys.

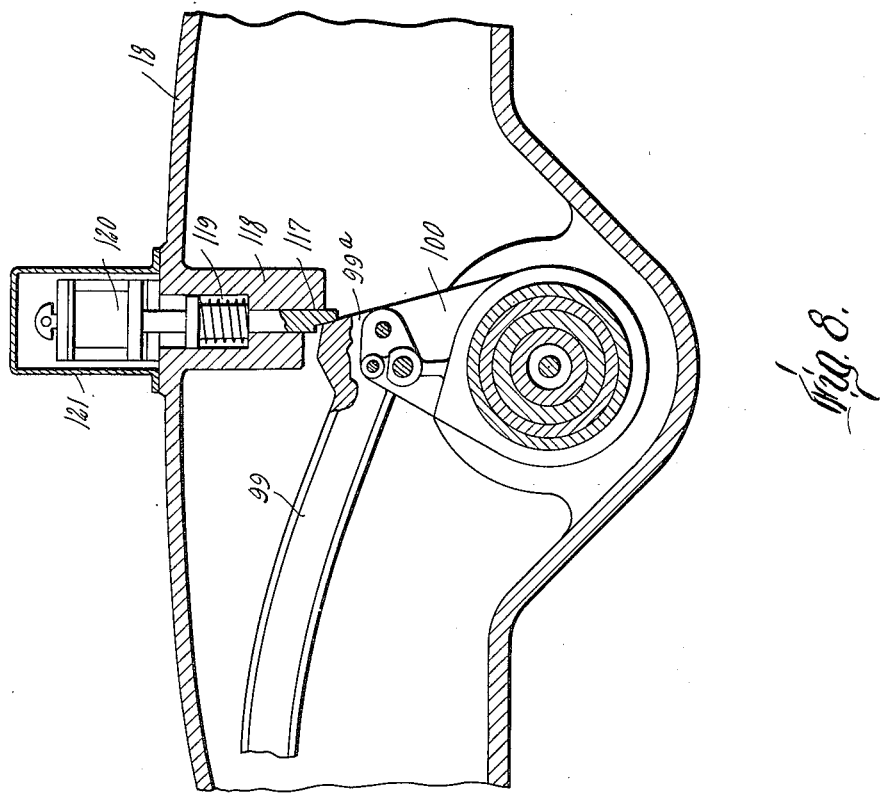
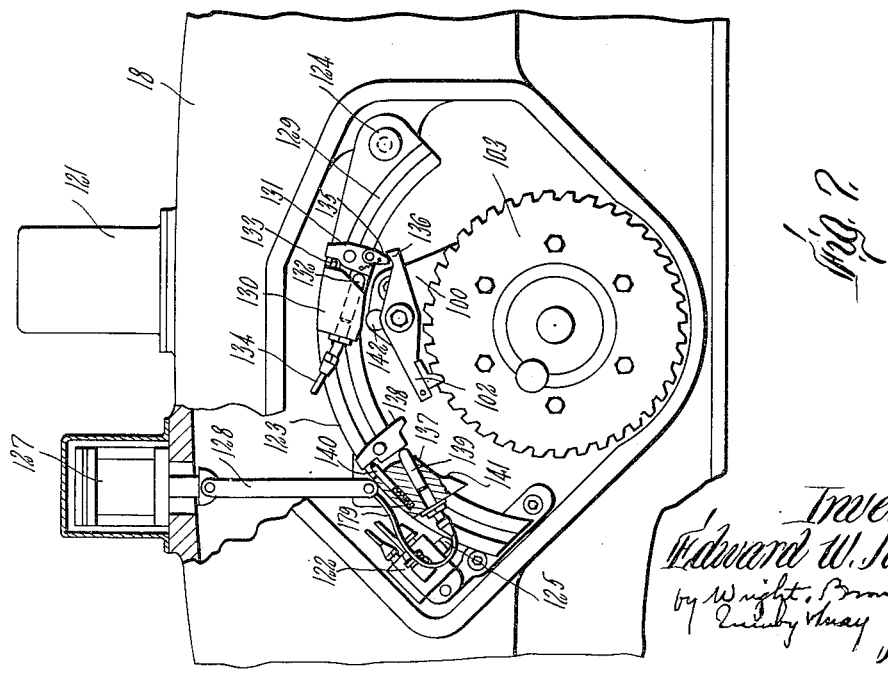

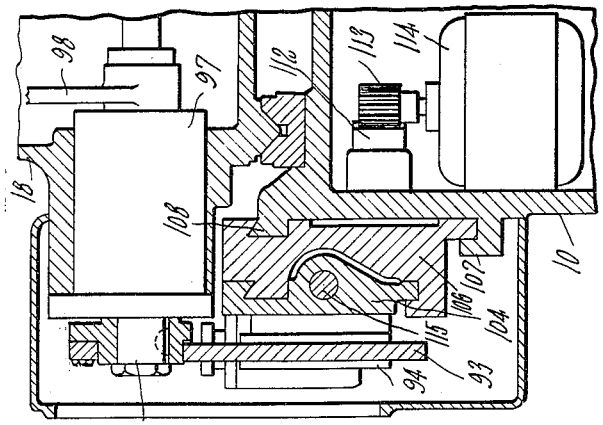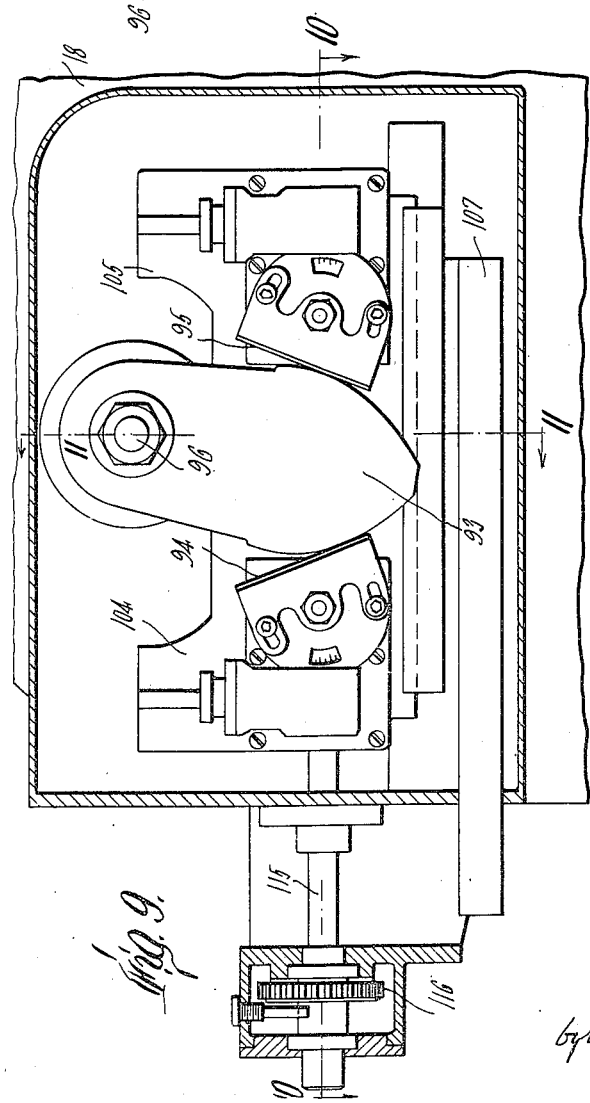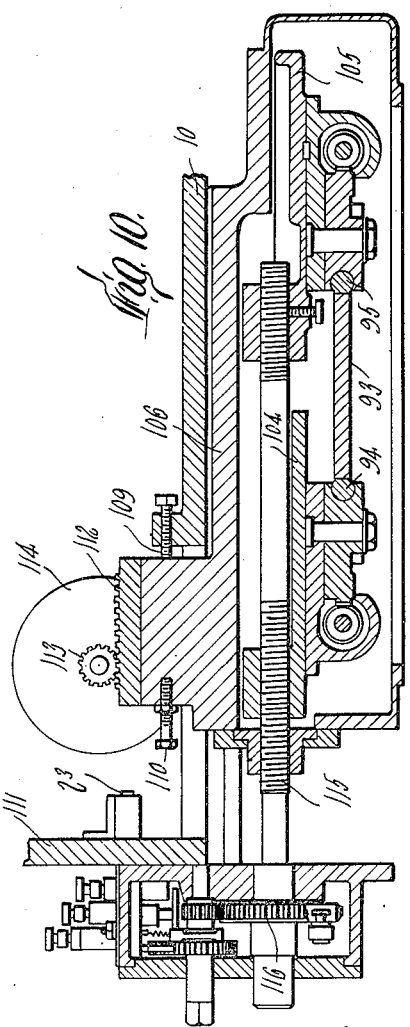

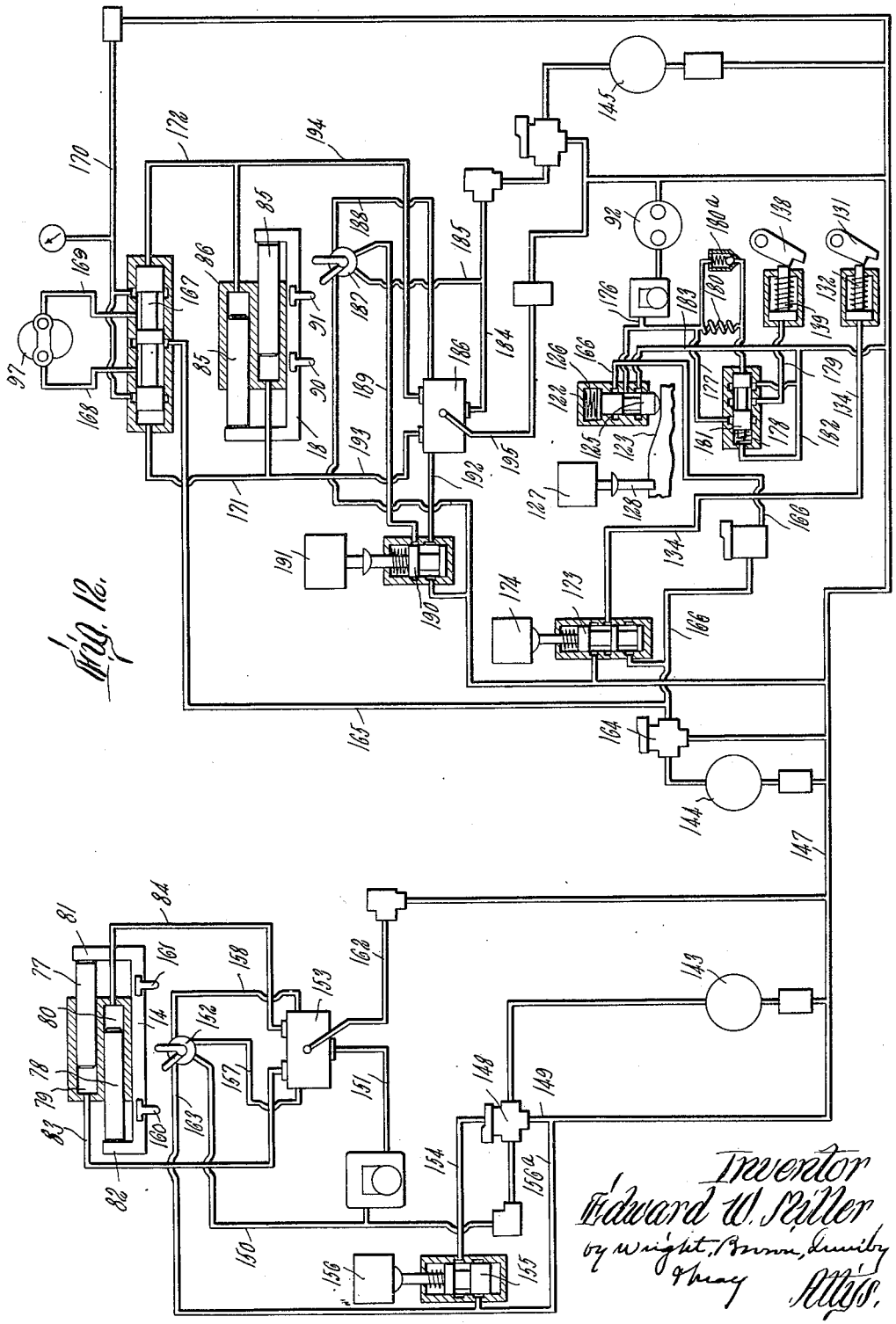

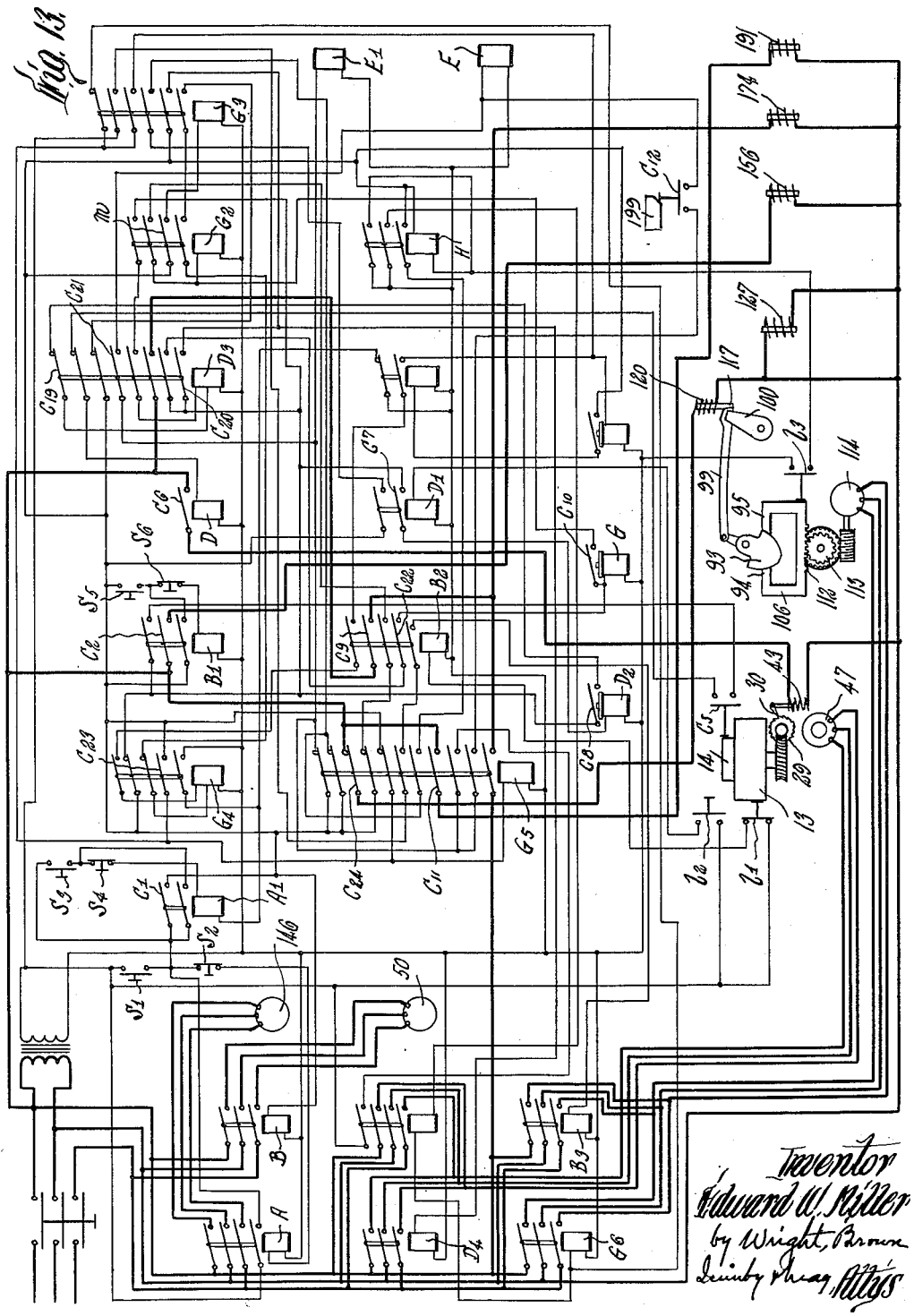

Patented June 3, 1952

2,599,408

UNITED STATES PATENT OFFICE 2,599,408

MACHINE FOR ROUGH MILLING AND GENERATIVE FINISHING OF MACHINE ELEMENTS

Edward W. Miller, Springfield, Vt., assignor to The Fellows Gear Shaper Company, Springfield, Vt., a corporation of Vermont Application June 6, 1946, Serial No. 674,838

10 Claims. (Cl. 90—3)

1

This invention relates to the art of metal working by cutting tools. Its primary object is to effect rough cutting and finish cutting of a work piece by means of separate cutters in a progressive operation without changing the manner in which the work piece and tools are set up in the machine. A part of the object is to impart a relative generating movement between the work and the cutter by which the finishing cut is made of such a character that the surfaces generated on the work are otherwise than complemental to the profile of the cutter. A final object is to produce finished work pieces from a previously uncut blank in less time than is required by the procedures heretofore used, and with an accuracy and quality of finish equal to that obtained by the more time consuming roughing and finishing operations of the prior art.

The principles of the invention may be applied in machine tools of various designs for producing machine elements and other work pieces of various kinds. One type of work which I have had particularly in view is for the rough cutting and generative finish cutting of gear teeth. The embodiment of the invention here illustrated is a machine designed for cutting gears with generated tooth face curves by the agency of milling cutters and in the following description those principles are explained with reference to that machine, but without intent to limit the scope of the invention specifically thereto.

In the drawings,

Fig. 1 is a front elevation of the machine referred to;

Fig. 2 is a vertical section of the machine taken on line 2—2 of Fig. 1;

Figure 5:
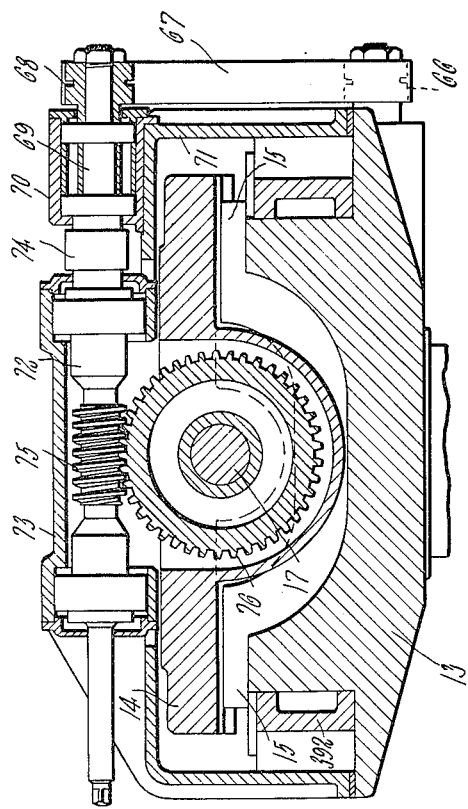
Figure 6:
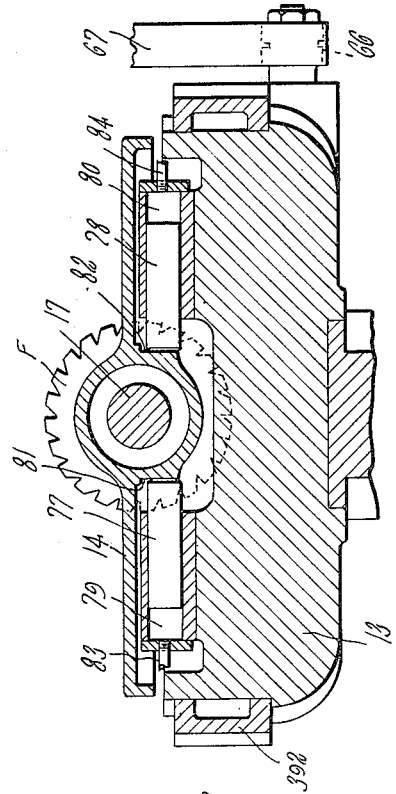

Figs. 3 and 4 are detail sections taken on lines 3—3 and 4—4, respectively, of Fig. 2;

Figs. 5 and 6 are sections taken on lines 5—5 and 6—6, respectively, of Fig. 1;

Fig. 7 is a partial rear elevation of the machine and a partial section showing details of the work indexing means with which the machine is provided;

Fig. 8 is a section taken on line 8—8 of Fig. 2;

Fig. 9 is a fragmentary rear elevation of the machine showing the means by which generative rotation is imparted to the work during the finish cutting action of the machine;

Figs. 10 and 11 are sectional views taken on lines 10—10 and 11—11, respectively, of Fig. 9;

Fig. 12 is a diagram of the hydraulic system by which certain parts of the machine are impelled in carrying out their operations;

Fig. 13 is a schematic diagram of the electrical

2 means by which other parts are driven and all parts are controlled.

Like reference characters designate the same parts wherever they occur in all the figures.

In this machine two milling cutters, shown at R and F, are mounted on the same shaft. The cutter R is the roughing cutter and may have a profile similar to that of the spaces between the gear teeth. That is, it may be what is commonly known as a formed cutter; although that is not an essential factor. It is rotated for cutting and given a reciprocating translative movement across the circumference of a work piece W in the direction of the axis of the work piece while the latter is withheld from rotation, and is fed toward the axis of the work piece between reciprocations. The cutter F is a finishing cutter, which is rotated and reciprocated in the same manner as the roughing cutter in the tooth spaces cut by the latter, while the work piece is rolled back and forth across its intruding rim to cause generation of face curves on the work piece which are conjugate to the profile of the cutter.

The structural features of the machine comprise a base 10 having separated uprights 11 and 12 between which is located a stool 13 on which a cutter carriage 14 is supported to reciprocate on guideways 15 and 16, and the cutter spindle 17 is rotatably mounted in suitable bearings in the carriage 14.

A work carriage 18 is mounted on the base uprights 11 and 12 so as to bridge across the intermediate space in which the cutters are located. This carriage is movable reciprocably in a horizontal path on guideways on the uprights and has a rotatable work spindle 19 (Fig. 2) and a tail stock 20 supporting a retractable dead center 21, in position to cooperate with the work spindle 19 to support work pieces.

The stool 13 is connected with a cylindrical tubular column 22 contained in a sleeve bearing 23 in the base, as shown by Fig. 2. Secured to the interior of the column 22 and bearing against the under side of a shoulder 24 therein is an annular nut 25, which meshes with a tubular screw 26 supported on a step bearing 27 in the base and centered by an annular bearing 28. Progressive steps of feeding movement of the cutters toward the work are imparted to the stool automatically by a ratchet 29 and pawl 30 (Fig. 3). This ratchet is secured to a shaft 31, which carries a bevel gear 32 meshing with a bevel gear 33 on an upright shaft 34. The latter shaft transmits rotation through a bevel gear pair 35 to a horizontal shaft 36 on which a pinion 37 is secured. This pinion drives a face gear 38 through an idle pinion 39. The face gear 38 is secured to the base of tubular screw 26 so that it rotates the screw whenever the shaft 31 is rotated, thereby raising or lowering the stool and cutters according to the direction of rotation of the shaft. Rotation of the stool while being raised and lowered is prevented by guides 391 on the base uprights contained in guideways in a band 392 which surrounds the rim of the stool and is clamped thereon. Stops 393 on the guides limit rise of the stool.

The direction of rotation imparted by the ratchet 29 is that which causes the stool to be raised. Pawl 30 is carried by an endwise movable bar 40, the upper end of which is reciprocable in a guideway 41 in the base, and the lower end of which is connected to the core 42 of a solenoid 43 secured immovably to the base. A spring 44 normally holds the pawl carrier 40 in the elevated position shown in Fig. 3, where the toe of the pawl is separated from the ratchet by a shield 45. A spring 46 is arranged to bear on the pawl and carry its toe into engagement with the nearest tooth of the ratchet when downward movement of the pawl carrier brings the pawl clear of shield 45. A long enough movement is given to the pawl carrier in each actuation to turn the ratchet by at least one tooth pitch. The solenoid is energized at intervals by means later described and so imparts a step by step movement to the stool.

The stool is rapidly withdrawn from the work after completion of a series of cuts, to permit indexing of the work during the rough-cutting procedure, and returned to position for commencing a further series of cuts after indexing, by a reversible electric torque motor 47, which is coupled by a chain 48 with a sprocket 49 also secured to shaft 31. The motor 47 is started, stopped, reversed and restarted automatically at prescribed intervals. When it is activated, the pawl driving solenoid 43 is deenergized and the pawl then is held clear of the ratchet.

The drive for the cutter shaft 17 is taken from an electric motor 50 (shown only in the electrical diagram), which drives a shaft 51 (Fig. 1) by a belt and a pulley 52. Shaft 51 is geared by a spur gear pair 53 to a shaft 54, which drives through bevel gears 55 and 56 a shaft 57 contained in a bearing 58 secured in the bearing 28, previously described, coaxially therewith and with the bearing sleeve 23.

Shaft 57 is made fast by splines 59 and a pin 60 to a tubular shaft section 61 which has a sliding splined connection with a shaft 62 mounted rotatably in a bearing 63 secured to the column 22 of the stool; shaft 62 having shoulders embracing bearing 63 so that it is moved endwise whenever the stool is moved, and to the same extent. Shaft 62 is connected by a bevel gear pair 64 with a shaft 65 mounted in a radial bearing in the stool, from the outer end of which the shaft protrudes, and the outer end of shaft 65 is connected by a belt and pulley, or chain and sprocket, drive 66, 67, 68 (Fig. 5), with a shaft 69. Shaft 69 is contained in a bearing 70 supported by a bridge structure 71 which is mounted on the stool and overlies a part of the cutter carriage 14. A worm shaft 72 is mounted rotatably in a housing 73 on said bridge structure in alinement with shaft 69, to which it is coupled by a coupling 74. A worm 75 on this worm shaft meshes with a worm wheel 76 secured to the cutter spindle 17.

The alined shafts 69 and 72 are parallel with the guideways on which the cutter carriage 14 reciprocates, and the worm housing 73 has a slidable engagement with the carriage, whereby driving connection is maintained with the cutter spindle throughout the full range of reciprocation of the carriage; and the worm wheel 76 is equal in diameter, or approximately so, at its pitch circle to the cutters R and F, the shaft bearings being suitably located to permit this condition to exist. Thus the cutting speed of the cutters relative to the work is maintained constant during reciprocations in both directions, provided the speed of the worm is constant.

Reciprocating motion is imparted to the cutter carriage by hydraulically actuated plungers 77 and 78 working in cylinders 79 and 80, respectively, secured on the stool. These plungers bear against oppositely facing abutment shoulders 81 and 82 on the carriage, whereby working fluid admitted alternately to the cylinders, and correspondingly relieved from them, causes the carriage to be moved back and forth. Connections for admission and exhaust of the working fluid are indicated at 83 and 84 in Fig. 6.

The work carriage 18 is reciprocated by means of a piston 85 (Fig. 1) working in a hydraulic cylinder 86. The cylinder is fixed rigidly to the upright 12 of the base structure in parallel with the carriage guideways, and the piston is formed as a collar or flange surrounding a rod 87, which extends through both heads of the cylinder and is secured to the carriage by a bracket 88. The head 89 at the left hand end of the cylinder as viewed from the front (Fig. 1) serves as a stop to limit the movement of the carriage to the left and locate the carriage in the position for performance of the rough cutting operation. In that position the axis of the work spindle is directly over the roughing cutter R and the path in which that cutter reciprocates. Admission and exhaust of working fluid to the cylinder at opposite sides of the piston is controlled by means later described in connection with the hydraulic diagram. However, a part of such means is shown in Fig. 1 consisting of adjustable dogs 90 and 91 on the carriage 18 adapted to move a trip valve back and forth.

A hydraulic indexing motor 92 (Fig. 2) is connected with the work spindle 19. This motor may be of any one of several known types of rotary motor and includes a housing or stator which is secured to the carriage structure and a rotor secured to the spindle. Pressure fluid is admitted to this motor under control of valve means, later described, from time to time when indexing of the work is needed.

In the operation of this machine the carriage remains stationary while rough cutting of the work is being performed by the cutter R, and the work is indexed after each tooth space or groove has been cut to the prescribed depth, until all of the prescribed number of tooth spaces or grooves have been cut. Then the carriage is shifted (to the right with respect to Fig. 1) into a position permitting the finishing cutter F to act on the work, and is reciprocated, with simultaneous rotary movement of the work spindle, so that the side of the work piece next to the cutter is rolled across the rim of the cutter to cause generation of surfaces divergent from the profile of the cutter. The rotative or angular component of movement is imparted to the work by the conjoint action of a cam member 93, which I have called a former, and abutments 94 and 95 at opposite sides of the former, as shown in Fig. 9. The former is secured to a shaft 96 (Fig. 11), rotatably held by the work carriage 18, to which the angularly movable part of a hydraulic motor 97 is secured, the stationary part of such motor being fixed in the carriage. An arm 98 secured to the shaft 96 (Fig. 1) is coupled by a connecting rod 99 with an arm 100 which has a rotative bearing at 101 (Fig. 2) on the work spindle 19. Arm 100 carries a coupling pawl 102 (Fig. 7) which engages one or another of a series of notches in an index wheel 103 secured to the spindle. Fluid pressure operating reversibly in the motor 97 causes the former 93 to bear on the abutments 94 and 95 alternately, in time with reversals of the carriage when the carriage is reciprocated, and angular movements of the former are transmitted through the connecting rod 99 and pawl 102 to the work piece.

The former and abutments here shown are substantially like corresponding parts shown in my Patent No. 2,387,166, October 16, 1945, and are operable and adjustable in the manner and for the purposes described in said patent. However, they include in addition a novel feature in that the abutment carriers 104 and 105 are supported by a holder 106 which is movable bodily on guides 107, 108 on the back of the base frame to right and left (with respect to Figs. 9 and 10) between limits established by an adjustable stop screw 109 on the base frame and an adjustable stop screw 110 on the part of the holder which makes contact with screw 109, projecting from the opposite side of that part of the holder toward a wall 111 of the base frame (Fig. 10) to engage the wall and arrest the holder at the limit of its movement away from stop screw 109. The holder 106 carries a rack element 112 in mesh with a pinion 113 in driven connection with a reversible torque motor 114, whereby the holder can be shifted between the limits indicated. A screw shaft 115 by which the abutments can be adjusted toward and away from one another (as described in my prior patent referred to), has a sliding splined engagement with the gear 116 by which it is rotated. The holder 106 is placed and held in the position shown in Fig. 10, against the stop 109 when the carriage is located as in Fig. 1 for the rough cutting of the work, and at the opposite limit of its displacement when the carriage is shifted to the location for finish cutting reciprocation so as to put the former into action for rolling the work past the finishing cutter.

The arm 100 is held stationary by a stop pin 117 (Fig. 8) when the carriage 18 and holder 106 are in the positions shown in the drawings; the motor 97 then exerting force to press a head 99a on the connecting rod 99 against said pin and press the former against abutment 94. The stop pin 117 is mounted in a guide 118 depending from the top wall of the carriage so as to be movable at its extremity into and out of the path of head 99a. It is acted on by a spring 119, which normally withdraws it and holds it out of the way of the head 99a; and it is connected with the core of a solenoid 120 secured to the carriage and so arranged that, when energized, it shifts the stop pin into blocking position against the resistance of spring 119. A housing 121 encloses the solenoid.

In order to cause indexing of the work spindle, the pawl 102 is disengaged from the index plate 103 and fluid pressure is applied to the indexing motor 92 at the same time. Admission and exhaust of working fluid to the indexing motor is controlled by a valve 122 mounted on carriage 18. This valve is operated by an arm 123 (Fig. 7) which is pivoted to the work carriage at 124. The casing of the valve 122 has connections with the indexing motor and with a source of fluid under pressure and the exhaust, and includes an actuator 125 arranged to admit pressure to the motor when the arm 123 is brought against it by swinging movement about the supporting pivot 124. The core of a solenoid 127 is coupled with arm 123 by a connecting rod 128 in an arrangement such that the solenoid, when energized, moves the arm in a direction to displace the actuator 125 in the manner which causes the valve to admit the pressure of working fluid to the indexing motor and so make that motor potentially active to rotate the work spindle whenever the pawl 102 is disengaged from the index plate 103. When solenoid 127 is deenergized, arm 123 falls back to the position shown in Fig. 7, and a spring 126 (Fig. 12) restores the actuator 125 to the previous position, whereby the working fluid is shut off from the motor. But the arm 123 can be shifted by other means later described in connection with rolling movements of the work spindle to activate the indexing motor from time to time.

Arm 123 is curved in an arc nearly concentric with the work spindle axis, and has a guideway 129 in which is adjustably mounted a bracket 130 carrying a pivoted dog 131. This bracket has a chamber in which is an endwise movable plunger 132 capable of being forced outward by hydraulic pressure against the dog 131 in a line extending at one side of the pivot of the dog, and the bracket contains also a spring pressed pin 133 pressing against the dog in a line at the opposite side of the pivot thereof from the pressure line of the plunger. Means for conducting hydraulic pressure to the plunger 132 is indicated at 134.

The dog 131 carries a pivoted trigger 135, which extends in interfering relation with a cam surface 136 on a tail extension of the coupling pawl 102. The trigger is held by a spring against a stop on the dog so that its extremity which overlaps the cam surface 136 is rigid in the direction away from that cam surface but is yieldable in the opposite direction. Force exerted on the dog by the plunger 132, when actuated by the working fluid, swings the dog 131 in the direction to cause its trigger to bear on and travel past the cam surface 136. Thereby the coupling pawl is released from the index plate 103. On the return movement of the dog, effected by the spring pressed pin 132 when the fluid pressure is released from the plunger, the trigger is able to yield and pass by the extremity of the cam surface 136 if the latter should then be in its path. Adjustment of the bracket 130 in guideway 129 enables the dog 131 to be put in correct operating relation with the cam surface.

Another bracket 137 carrying a pivoted dog 138 is mounted on arm 123 in adjustable engagement with the guideway 129. This bracket is equipped with a fluid operated plunger 139 and spring pressed pin 140 arranged to bear and exert pressure against the dog 138 in lines on opposite sides of the pivot of the dog. The construction and arrangement of plunger and pin with respect to the dog are essentially alike in both brackets 130 and 137.

Bracket 137 is adjusted to a point at which the extremity of dog 138 will engage cam surface 136 and displace the coupling pawl when the arm 100 nears the end of its oscillative motion in one direction during the generating phase of the operation of the machine. The bracket has in addition a cam surface 141 in position to be engaged by a shoulder 142 on arm 100 at the same time when the coupling pawl 102 has been displaced, or immediately before. Shoulder 142, acting on cam surface 141, shifts the arm 123 with consequent actuation of valve 122 to admit working fluid to the indexing motor, whereby the work is indexed during separation of pawl 102 from the index plate. The tail of the pawl passes the extremity of the dog 138 directly after the indexing motor has been thus started, whereby the pawl is free to reengage another notch of the index plate, being actuated thereto by a spring, not shown. On the return movement of arm 100 thereafter, the tail extremity of pawl 102 displaces the dog 138 in passing, without being itself displaced; the spring pressed pin 140 then yielding to permit such displacement of the dog.

The hydraulic system by which the cutter carriage, work carriage, indexing motor and former impelling motor of the machine embodiment here described are operated is shown in Fig. 12. Three pumps designated 143, 144 and 145 are connected to be driven simultaneously by an electric motor 146 (Fig. 13). All the pumps take working fluid, which may be oil, from a source of supply, such as a tank, indicated by the line 147. Pump 143 delivers oil to a valve 148 from which there is a return or bypass connection 149 to the source and a delivery connection having branches 150, 151 leading to a trip or pilot valve 152 and a reversing valve 153, respectively. Valve 148 is also connected by a line 154 to a control valve 155 operated by a solenoid 156. When the solenoid is energized, valve 155 closes a connection between the line 154 and a return line 156a, whereby back pressure is developed in line 154 which hold closed the by-pass connection 149 from the valve 148 and causes oil to be delivered under pressure to lines 150 and 151. But when the solenoid 156 is deenergized, it shifts valve 155, or allows it to be shifted by a spring, so as to release the back pressure in line 154 to the return line 156a, whereby the valve 148 is shifted to open the bypass connection 149 so that the pump circulates the oil ineffectually.

Valve 153 is a reversing slide valve having ports connected with the lines 83 and 84, respectively, which conduct oil to the cylinders 79 and 80 (shown in Fig. 6), of the means for reciprocating the cutter carriage. The slide element in valve 153 is shifted back and forth by pressure delivered through pipes 157 and 158 under the control of pilot valve 152. The pilot valve contains an internal rotary valve member which is turned alternately in opposite directions by adjustable dogs 160 and 161 on the carriage 14. In one position of the pilot valve, pressure is transmitted through the connection 157 to the left hand end of valve 153, thereby putting that valve in position to transmit pressure fluid from the line 151 through line 83 to cylinder 79, and to connect the line 84 from cylinder 80 with the exhaust connection 162 from valve 153 with the oil source. In the other position of the pilot valve, these connections are reversed. A pipe line 163 leads from the pilot valve to the supply tank, for permitting release of oil from either connection 157 or 158 when the other is connected to receive pressure from the pump.

Pump 144 is similarly connected through a bypass control valve 164 with a bypass to the oil tank and pressure with lines 165 and 166 leading, respectively, to a slide valve 167, which controls the former-impelling motor 97, and to the control valve 122 for the indexing motor 92. Slide valve 167 is similar to the valve 153. In one position it connects the pressure line 165 with a line 168 leading to motor 97 for driving the latter in one direction, connecting a line 169 from the opposite side of the motor with an exhaust connection 170; and in the opposite position, the slide valve connects the pressure line 165 with line 169 for driving the motor in the opposite direction, connecting line 168 with the exhaust connection 170. Pressure is admitted to opposite ends of the reversing valve 167 to shift the slide element therein by pipe lines 171 and 172 under control of the valves which control, and are controlled by, the work carriage 18, so that the direction of force application on the former 93 is reversed with reversals of the force application to the work carriage motor.

The pressure line 166 from the pump 144 is connected by a branch connection with a control valve 173 having an internal slide member which is coupled with the core of a solenoid 174, and a pipe line 134 leads from the casing of valve 173 to the plunger 132 by which the tripping dog 131 of the pawl 102 is actuated. In the deenergized condition of solenoid 174, line 134 is in exhausting connection with the oil supply; and when the solenoid is energized, pressure is applied to plunger 132.

Working fluid for driving the indexing motor 92 is delivered from valve 122 through a pipe line 176. A branch 177 from this line passes to a port in a slide valve casing 178, from another port of which a line 179 leads to the pressure chamber in which plunger 139 is mounted. Another branch from line 176, containing a retarding coil 180 leads to one end of the valve casing 178 for shifting the slide valve element 181 therein endwise toward the other end of the casing, from which there is an exhaust connection 182. A return bypass, controlled by a check valve 180a is connected across the retarding coil.

With the valves 122 and 181 in the positions shown in Fig. 12, which are those occupied when solenoid 127 is inactive, the line 176 and its branches are cut off from the pressure line 166. When the solenoid 127 is energized, and also when arm 123 is displaced by action of the arm 109 which oscillates the work spindle, line 176 is connected with the pressure line 166. Also pressure exerted with delayed action through coil 180 shifts slide valve 181 and causes pressure to be exerted on plunger 139, thereby shifting dog 138 into the path in which the tail of the index pawl 102 travels.

Pump 145 delivers pressure through branches 184 and 185 of a pipe line to a reversing valve 186 and a pilot valve 187. The pilot valve 187 has fingers actuated by the dogs 90 and 91 on the work carriage to connect the pressure line 185 alternately with a pipe line 188 leading to one end of the reversing valve 186, and a pipe line 189 leading to a control valve 190 which is actuated by a solenoid 191. A pipe line 192 leads from the control valve 190 to the end of reversing valve 186 opposite to that with which the line 188 is connected. Pipe lines 193 and 194 lead to the opposite ends of the motor cylinder 86 by which the work carriage is reciprocated, and are connected alternately with the pressure line 184 and an exhaust line 195. The lines 171 and 172 leading to opposite ends of the reversing valve 167 are coupled with the lines 193 and 194, respectively, whereby the motor 97 (by which former 93 is impelled) is reversed simultaneously with the work carriage 18.

When solenoid 191 is inactive, valve 190 closes the connection between the lines 189 and 192, and connects line 192 with the exhaust line, permitting the reversing valve 186 to occupy the position wherein lines 184 and 194 are connected and pressure is applied to the work carriage motor to hold the carriage in the position shown in Fig. 1; and force is exerted on the former impelling motor 97 to cause the former to be pressed against abutment 94 and the head 99a on connecting rod 99 to be pressed against stop pin 117. Activating of solenoid 191 causes valve 190 to connect lines 189 and 192, whereby slide valve 186 is shifted to its opposite position, and the cutter carriage moved away from the roughing position to the location in which it performs its automatic reciprocating action and the generative finishing cuts are performed.

The motors and solenoids mentioned in the preceding description are controlled electrically by switches, coils, contactors, and timing relays shown in the electrical wiring diagram, Fig. 13.

A starting switch $s^1$ and stop switch $s^2$ are in circuit with the coil of a magnetic starter A which, when energized, closes the starter contacts and applies power to the pump motor 146 by which the pumps 143, 144 and 145 are driven. Another starting switch $s^3$ and stop switch $s^4$ are in circuit with the coil of magnetic starter $A^1$ which, when energized, closes a contact $c^1$. This in turn energizes the coil of magnetic starter B for the cutter motor 50, which closes the starter and applies power to that motor. Another starting switch $s^5$ and stop switch $s^6$ are in circuit with the coil $B^1$ which, when energized, closes a contact $c^2$ and energizes coil 156 which operates hydraulic valve 155. The solenoids 120 and 127 are energized, placing stop pin 117 in blocking position, and causing hydraulic pressure to be applied to the indexing motor 92. Pressure is also applied to the hydraulic motor 97, causing former 93 to be pressed against abutment 94 and head 99a to be pressed against stop pin 117.

Thus when the switches $s^1$, $s^3$ and $s^5$ (which may be push button switches and are so indicated in Fig. 1), are operated, the motor operating the hydraulic pumps, the cutter driving motor, and the cutter carriage reciprocation are all started.

Let it be assumed that the stool is down and switches $s^1$, $s^3$ and $s^5$ have been closed.

Each time the cutter carriage 14 reaches the end of its stroke in one direction, it closes the interclock $c^5$, which energizes the coil of contactor D through closed contact $c^2$ and one of the closed contacts of contactor $D^3$. The contact $c^6$ of contactor D closes and energizes coil of solenoid 43 which actuates the feed pawl 30, and lifts the stool through a step of feeding movement.

This continues until the stool reaches the predetermined upper limit of its travel. At this time, limit switch $l^2$ closes. It is so closed by an actuator 197 (Fig. 1) mounted adjustably on the stool to enable the location of the upper limit of movement to be varied. Closing of switch $l^2$ energizes coil of contactor $D^1$, which operates a contact $c^7$ to close the motor circuit of timing relay $D^2$. The timer $D^2$ operates. After a time (allowing the cutter carriage to take a complete stroke) the timer contact $c^8$ closes, which energizes coil of contactor $D^3$ through normally closed contact $c^{19}$. A contact $c^{20}$ of $D^3$ then closes the coil circuit of the stool motor starter $D^4$ which becomes active and applies power to stool motor 47 to lower the stool.

Another contact $c^{21}$ of contactor $D^3$ causes the ratchet coil E of a counter 198 (see Fig. 1) to be energized, causing the counter to count one. Limit switch $l^2$ is opened when the stool commences its descent and switch $l^1$ is closed when the stool reaches its bottom position. This closing of $l^1$ closes the circuit to coil of contactor $B^2$ which is energized. One contact $c^9$ of $B^2$ closes the circuit of solenoid 174 which operates, whereby valve 173 is shifted to cause the index pawl tripping dog 131 to release pawl 102 and permit indexing of the work. The coil of solenoid 127 being then energized, the valve 122 is open admitting fluid pressure to the hydraulic indexing motor 92. Hence, when the index pawl is tripped (disengaged from index plate 103 and quickly released), the work spindle indexes one notch.

When coil of contactor $B^2$ was energized as stool reached its bottom position, another of its contacts, $c^{22}$, closed and energized motor of time delay relay G. After the time setting of G (to allow indexing to take place), its contact $c^{10}$ was closed, which energized coil of contactor $G^2$.

This operation of contactor $G^2$ throws the control back to the interlock $c^5$ on the cutter carriage so that at the end of each stroke of the cutter carriage, the interlock $c^5$ closes and causes the stool operating ratchet 29 to be turned up one notch. As the stool reaches the top limit (controlled by $l^2$), the stool is lowered as before.

The counter 198 is turned by its ratchet one step each time the stool is raised.

After the counter 198 has counted the number of notches in work (for which it is set) the contact $m$ of contactor $G^2$ closes, and the stool descends. The coil of contactor $G^3$ is energized and the latter causes coil of contactor $G^4$ to be energized. A contact $c^{23}$ of $G^4$ energizes coil of contactor $G^5$. The last named contactor closes its contact $c^{11}$ in the circuit of the valve operating solenoid 191 and opens its normally closed contact $c^{24}$ in the circuit of solenoid 127 and the pin operating solenoid 120, whereby the means for reciprocating the work slide are set into operation and the obstructing pin 117 is moved out of the way of the oscillating work spindle arm. Solenoid 127 is deenergized, releasing oil pressure from index motor 92 and from plunger 139 of dog 138. Control of valve 122 is thereby transferred to the arm 123, which is free to be controlled by the oscillating spindle arm 100. When arm 100 is rotated counterclockwise to near the end of its stroke, the indexing operation can take place. Contactor coil $G^3$ is deenergized after counter 198 has been reset and coil of $G^5$ has energized.

Coil of $G^3$ contactor is then deenergized.

This closes the circuit of a coil $G^6$ which by closing a switch in one of the circuits of motor 114, causes the motor to shift the abutment-carrying block 106 into its position for performing the finishing operation on the work, as determined by the adjustable stop 110. When in that position an interlocking switch l³ is engaged by the block and closed, whereby the coil of a contactor H is energized and three contacts are closed. The stool is raised to the elevated position suitable for finish cutting by its motor 47 and held there until all the teeth of the work piece have been finished. This elevated position is determined by the stops 393. A coil E¹ in the counter is operated to release the driving ratchet thereof and permit the counter to return to zero.

Following actuation of solenoid 191, the work carriage is set into automatic reversal by the hydraulic system described and the impelling motor 97 for the former is reversed in time with reversals of the carriage. Thereby the work is rolled across the rim of the finishing cutter F; and it is indexed at the end of each travel of the carriage in one direction, by the indexing motor 92 when pawl 102 is tripped by dog 138. A switch actuator 199 is mounted adjustably on the carriage in position to engage a projecting part on a switch $c^{12}$ which is in the circuit of the coil E by which the driving mechanism for counter 198 is operated, and closes that switch in the course of each travel of the carriage from left to right. Closing of that switch causes the coil E of the counter to be energized and the counter indicator to be advanced a step. At the completion of a prescribed number of steps, the counter causes contact m to be closed whereby coil of contactor G³ is energized.

Circuits are thereby closed which cause the motor 47 to lower stool 13. The stool reaches bottom and switch l¹ closes, which operates contactor B². A contact of B² closes the circuit of contactor coil B³ whereby the reversing switch of motor 114 is closed. The motor is driven in reverse, whereby the abutment carrying block 106 is withdrawn to the position for the first cutting operation. A short time later the coil of contactor A¹ is deenergized, and solenoids 156, 174, 191, 120 and 127 are deenergized, whereby the machine is stopped with the work carriage in the left hand position (Fig. 1) ready to repeat the cycle when a blank work piece has been substituted for the finished piece. The stool is lowered until it reaches a positive stop at the bottom. As its motor 47 is a torque motor it can remain energized without harm when stalled by arrest of the stool.

It has been previously stated that the principles of the invention may be embodied in mechanical constructions of different designs than that here shown. Among the variations which may be made is to substitute a grinding wheel for a milling cutter as the finishing tool. However, the roughing cutter must of practical necessity be a milling cutter in order to accomplish the desired result of rapid production. Other electrical units and combinations than those here shown may be employed, within the skill of the electrical engineer; and I may employ wholly mechanical operating and controlling means, although the hydraulic and electrical means are preferred. It is preferable also to employ electric torque motors as the means for imparting the rapid movements to the stool and the abutment carrier, as these motors are able to exert constant force when energized, even though stationary; and like motors may be used instead of hydraulic motors for indexing the work spindle and impelling the former.

I claim:

1. A roughing and finishing machine tool comprising a work carriage, a work spindle rotatably mounted on said carriage, a tool holder, roughing and finishing cutters supported by said holder with a space between them, means for actuating said cutters, said work carriage and cutter holder being relatively displaceable to bring the roughing cutter and finishing cutter separately into operating relation with a work piece mounted on the work spindle, and control means organized to hold the work carriage and spindle stationary while the roughing cutter is in operating relation to the work piece, and to impart reciprocative movements to the carriage and correlated rotational movements to the spindle when the finishing cutter is in the operating relation to the work piece.

2. A roughing and finishing machine comprising a cutter holder, a preliminary cutter and a finishing cutter rotatably mounted on said holder with a space between them wide enough to permit each to have an operating relationship with the same work piece independently of the other, work holding means including a rotatable spindle adapted to hold a blank work piece, said cutter holder and work holder being relatively shiftable to effect operating relationship between each cutter in turn and such work piece, means for effecting a progressive feeding displacement between the cutter holder and work holder when the preliminary cutter is in the operating relationship to the work, and means for effecting relative rolling movements between the work holder and finishing cutter when the latter is in the operating relationship to the work.

3. A roughing and finishing machine comprising a cutter supporting stool, a cutter carriage movable reciprocably on said stool, a cutter spindle rotatably mounted on the cutter carriage with its axis transverse to the directions of movement of said carriage, roughing and finishing cutters secured to said spindle and spaced apart axially of the spindle, means for imparting movement to the stool in the direction transverse to both the path of said carriage and the axis of said shaft, a work carriage movable in a path transverse to the planes of rotation of the cutters, a work spindle rotatably mounted on the work carriage with its axis transverse to the cutter spindle axis and in relation to the cutters such that a work piece secured to it can be placed, by displacement of the work carriage, into position for being acted on by either cutter independently of the other, control means for holding the work carriage and spindle stationary while the work is in operating position with respect to the roughing cutter, and means for causing the work carriage to be reciprocated and the work spindle to be rotated in correlation to effect a rolling movement of the work piece across the plane of the finishing cutter.

4. A machine according to claim 3, combined with indexing means for the work spindle and controlling devices thereof operative to impart steps of rotation to the spindle while the work carriage is stationary with respect to the roughing cutter and also while the work carriage is in reciprocating motion with respect to the finishing cutter.

5. A roughing and finishing machine comprising a cutter supporting stool having reciprocative feeding and return movements, a cutter carriage reciprocable on said stool in a path transverse to the directions of the movements of the stool, a cutter spindle mounted rotatably on said carriage with its axis transverse to both the path of the carriage and the directions in which the stool is movable, roughing and finishing cutters mounted on said spindle with an axial spacing between them, means for supporting a work piece in different locations, one of which locations is contiguous to the roughing cutter and clear of the finishing cutter and the other location is contiguous to the finishing cutter and clear of the roughing cutter, means for imparting simultaneous movements of rotation to the cutter spindle, reciprocations to the cutter carriage, and advance to the stool while the work is in position to be acted on by the roughing cutter, means for withdrawing the stool while the work is in that position, means for indexing the work while the stool and cutter are withdrawn, control means for causing the said movements of the stool and work piece to be repeated a prescribed number of times, and means for subsequently imparting to the work piece a succession of rolling movements back and forth in cutting relation to the finishing tool, and for indexing the work piece between successive rolling movements.

6. In a machine tool having a cutter supporting stool and a cutter carriage mounted to reciprocate on said stool, means for reciprocating said carriage, means operated by the carriage to cause steps of advancing movement to be imparted to the stool, and means operated by the stool when arriving at a prescribed point in its advancing movement for causing the stool to be retracted.

7. In a roughing and finishing machine having a reciprocable work carriage, a work spindle rotatably mounted on said carriage, means for reciprocating the carriage and a former cooperating with abutments and connected with the spindle to impart angular movements to the spindle correlated with linear movements of the carriage, means for holding the carriage in one operative location and blocking the former and abutments to prevent spindle rotation, and control means for causing the carriage to be put into reciprocating movement and the former and abutments to be simultaneously unblocked.

8. In a roughing and finishing machine having a reciprocable work carriage, a rotatable work spindle on the carriage, means for reciprocating the carriage and simultaneously turning the spindle back and forth in time with movements of the carriage, and indexing means operable under control for turning the spindle in one direction independently of said spindle turning means; control means including devices for holding the carriage at one limit of its movement and simultaneously blocking the spindle turning means, devices for causing operation of the spindle indexing means while in blocked condition, devices for unblocking the spindle turning means and putting such means and the carriage operating means into action, and other devices for causing the indexing means to act on the spindle at prescribed intervals during repeated translative and oscillative movements of the carriage and spindle, respectively.

9. In a machine of the character described, the combination of a supporting structure, a work carriage mounted to reciprocate thereon, a work spindle on the carriage, a former operatively connected with said spindle to control angular movements thereof, an abutment holder mounted on the supporting structure, abutments on said holder engaged with the former, and means for shifting the abutment holder into different positions, in one of which the former is made inoperative for causing angular movements of the spindle, and in the other of which the former is made operative for that purpose.

10. In a machine of the character described, the combination of a supporting structure, a work carriage mounted to reciprocate thereon, a work spindle on the carriage, a former operatively connected with said spindle to control angular movements thereof, an abutment holder mounted on the supporting structure, abutments on said holder engaged with the former, means for shifting the abutment holder into positions for making the former operative and inoperative, respectively, for causing angular movements of the spindle, blocking means for the former movable into and out of a position in which it prevents angular movement of the former, and common control means for said blocking means and abutment holder.

EDWARD W. MILLER.

REFERENCES CITED

The following references are of record in the file of this patent:

UNITED STATES PATENTS

| Number | Name | Date |
|---|---|---|
| 1,283,693 | Derr | Nov. 5, 1918 |
| 1,341,034 | Beede | May 25, 1920 |
| 1,983,019 | DeLeeuw | Dec. 4, 1934 |
| 2,136,266 | Reinecker | Nov. 8, 1938 |
| 2,347,997 | Drummond | May 2, 1944 |
| 2,387,166 | Miller | Oct. 16, 1945 |
| 2,394,757 | Drummond | Feb. 12, 1946 |
| 2,416,749 | Grey | Mar. 4, 1947 |
| 2,435,405 | Praeg | Feb. 3, 1948 |